US012802613B2

(12) United States Patent
Kim et al.

(10) Patent No.: US 12,802,613 B2
(45) Date of Patent: Nov. 17, 2026

(54) DISPLAY DEVICE, METHOD OF DRIVING THE DISPLAY DEVICE, AND ELECTRONIC DEVICE INCLUDING THE DISPLAY DEVICE

(71) Applicants: Samsung Display Co., LTD., Yongin-si (KR); UIF (University Industry Foundation), Yonsei University, Seoul (KR)

(72) Inventors: Hyosun Kim, Yongin-si (KR); Hyungsuk Hwang, Yongin-si (KR); Sang Chul Chong, Seoul (KR); Cheongil Kim, Seoul (KR); Jeong Hyeon Park, Seoul (KR); Yunsoo Yeo, Seoul (KR); Jieun Cho, Seoul (KR); Jeunghwan Choi, Seoul (KR)

(73) Assignees: SAMSUNG DISPLAY CO., LTD., Gyeonggi-do (KR); UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 0 days.

(21) Appl. No.: 19/274,972

(22) Filed: Jul. 21, 2025

(65) Prior Publication Data

US 2026/0141838 A1 May 21, 2026

(30) Foreign Application Priority Data

Nov. 19, 2024 (KR) ........................ 10-2024-0164955

(51) Int. Cl.
*G09G 3/20* (2006.01)

(52) U.S. Cl.
CPC ... *G09G 3/2092* (2013.01); *G09G 2320/0247* (2013.01); *G09G 2330/021* (2013.01)

(58) Field of Classification Search
CPC ......... G09G 3/2092; G09G 2320/0247; G09G 2330/021
See application file for complete search history.

(56) References Cited

U.S. PATENT DOCUMENTS

2006/0087502 A1* 4/2006 Karidis ................. G06F 1/3218 345/211
2011/0032231 A1* 2/2011 Maruyama ........... G09G 3/2096 345/208

(Continued)

FOREIGN PATENT DOCUMENTS

KR 20230118211 A 8/2023
KR 20250021158 A 2/2025

OTHER PUBLICATIONS

Krajancich, et al., "A Perceptual Model for Eccentricity-dependent Spatio-temporal Flicker Fusion and its Applications to Foveated Graphics", ACM Trans. Graph., vol. 40, No. 4, Article 47, Aug. 2021, 11 pages.

*Primary Examiner* — Dmitriy Bolotin
(74) *Attorney, Agent, or Firm* — CANTOR COLBURN LLP

(57) ABSTRACT

A display device includes a display panel including a display region and a display panel driver configured to perform a multi-frequency driving for the display region. The display region includes a first frequency partial region driven at a first frequency and a low frequency partial region driven at a low frequency lower than the first frequency. The display panel driver is configured to determine a driving frequency of the low frequency partial region as a frequency greater than a minimum low frequency based on a position of the low frequency partial region.

18 Claims, 5 Drawing Sheets

(56) References Cited

U.S. PATENT DOCUMENTS

| | | | | |
|---|---|---|---|---|
| 2015/0054800 | A1* | 2/2015 | Kim | G09G 3/3648 345/204 |
| 2016/0111055 | A1* | 4/2016 | Na | G09G 3/3666 345/94 |
| 2017/0018234 | A1* | 1/2017 | Na | G09G 3/3406 |
| 2021/0027720 | A1* | 1/2021 | Park | G09G 3/3291 |
| 2021/0118354 | A1* | 4/2021 | Ahn | G09G 3/2077 |
| 2021/0201746 | A1* | 7/2021 | Seo | G09G 3/2059 |
| 2021/0272511 | A1* | 9/2021 | Rim | G09G 3/32 |
| 2021/0304680 | A1* | 9/2021 | Park | G09G 3/3233 |
| 2022/0068195 | A1* | 3/2022 | Yun | G09G 3/32 |
| 2022/0068216 | A1* | 3/2022 | Yoon | G09G 3/3275 |
| 2022/0076634 | A1* | 3/2022 | Yoon | G09G 3/3233 |
| 2022/0189363 | A1* | 6/2022 | Jung | G09G 3/20 |
| 2022/0351660 | A1* | 11/2022 | Kim | G09G 3/20 |
| 2023/0087545 | A1* | 3/2023 | Yoon | G09G 3/3233 345/204 |

* cited by examiner

DISPLAY DEVICE, METHOD OF DRIVING THE DISPLAY DEVICE, AND ELECTRONIC DEVICE INCLUDING THE DISPLAY DEVICE

This application claims priority to Korean Patent Application No. 10-2024-0164955, filed on Nov. 19, 2024, and all the benefits accruing therefrom under 35 U.S.C. § 119, the content of which in its entirety is herein incorporated by reference.

BACKGROUND

1. Field

Embodiments of the present invention relates to a display device, a method of driving the display device, and an electronic device including the display device. More particularly, the present invention relates to a display device, a method of driving the display device, and an electronic device including the display device for performing a Multi-Frequency Driving (MFD).

2. Description of the Related Art

In general, a display device includes a display panel and a display panel driver. The display panel includes gate lines, data lines, and pixels. The display panel driver includes a gate driver for providing a gate signal to the gate lines, a data driver for providing a data voltage to the data lines, and a driving controller for controlling the gate driver, the data driver, and the emission driver.

Recently, a multi-frequency driving has been developed to drive partial regions of the display panel with different driving frequencies. In a display device to which the multi-frequency driving is applied, some of the partial regions may be driven at a low frequency, such that a power consumption of the display device may be reduced. However, when some of the partial regions are driven at the low frequency, a flicker may be recognized in the some of the partial regions.

SUMMARY

Embodiments of the present invention provide a display device for preventing a flicker while performing an enhanced multi-frequency driving.

Embodiments of the present invention provide a method of driving the display device.

Embodiments of the present invention provide an electronic device including the display device.

In an embodiment of a display device according to the present invention, the display device includes a display panel including a display region and a display panel driver configured to perform a multi-frequency driving for the display region. The display region includes a first frequency partial region driven at a first frequency and a low frequency partial region driven at a low frequency lower than the first frequency. The display panel driver is configured to determine a driving frequency of the low frequency partial region as a frequency greater than the minimum low frequency based on a position of the low frequency partial region.

In an embodiment, the minimum low frequency may be calculated based on a position of the low frequency partial region with respect to a center of a sight.

In an embodiment, the minimum low frequency may be the minimum horizontal low frequency when the low frequency partial region is arranged in a horizontal direction with respect to the center of the sight. The minimum low frequency is the minimum vertical low frequency when the low frequency partial region is arranged in a vertical direction with respect to the center of the sight. The minimum horizontal low frequency may be different from the minimum vertical low frequency.

In an embodiment, the minimum horizontal low frequency may be greater than the minimum vertical low frequency.

In an embodiment, the minimum horizontal low frequency may include the minimum left low frequency and the minimum right low frequency. The minimum low frequency may be the minimum left low frequency when the low frequency partial region is arranged in a left direction with respect to the center of the sight. The minimum low frequency may be the minimum right low frequency when the low frequency partial region is arranged in a right direction with respect to the center of the sight.

In an embodiment, the minimum vertical low frequency may include the minimum upper low frequency and the minimum lower low frequency. The minimum low frequency may be the minimum upper low frequency when the low frequency partial region is arranged in an upper direction with respect to the center of the sight. The minimum low frequency may be the minimum lower low frequency when the low frequency partial region is arranged in a lower direction with respect to the center of the sight.

In an embodiment, the minimum low frequency may be a critical flicker frequency at which a flicker is recognized.

In an embodiment, the center of the sight may be determined based on a division line dividing the first frequency partial region and the low frequency partial region.

In an embodiment, the center of the sight may be determined in a real time using a sensor.

In an embodiment, the display panel driver may be configured to determine whether the low frequency partial region is included in a region driven at the low frequency when the display panel limits the region driven at the low frequency.

In an embodiment, the minimum low frequency may be the minimum horizontal low frequency when the display panel is driven in a horizontal mode in which the first frequency partial region and the low frequency partial region are arranged adjacently in a horizontal direction. The minimum low frequency may be the minimum vertical low frequency when the display panel is driven in a vertical mode in which the first frequency partial region and the low frequency partial region are arranged adjacently in a vertical direction. The minimum horizontal low frequency may be different from the minimum vertical low frequency.

In an embodiment, the minimum horizontal low frequency may be greater than the minimum vertical low frequency.

In an embodiment, the minimum low frequency may vary according to a luminance of the low frequency partial region.

In an embodiment of a method of driving a display device according to the present invention, the method includes receiving input image data, calculating a position of a low frequency partial region, among a first frequency partial region driven at a first frequency and a low frequency partial region driven at a low frequency which are included in a display region of a display panel, based on the input image data, where the low frequency is lower than the first frequency, and determining a driving frequency of the low frequency partial region as a frequency greater than the minimum low frequency.

In an embodiment, the minimum low frequency may be calculated based on a position of the low frequency partial region with respect to a center of a sight.

In an embodiment, the minimum low frequency may be the minimum horizontal low frequency when the low frequency partial region is arranged in a horizontal direction with respect to the center of the sight. The minimum low frequency may be the minimum vertical low frequency when the low frequency partial region is arranged in a vertical direction with respect to the center of the sight. The minimum horizontal low frequency may be different from the minimum vertical low frequency.

In an embodiment, the minimum horizontal low frequency may be greater than the minimum vertical low frequency.

In an embodiment, the minimum horizontal low frequency may include the minimum left low frequency and the minimum right low frequency. The minimum low frequency may be the minimum left low frequency when the low frequency partial region is arranged in a left direction with respect to the center of the sight. The minimum low frequency may be the minimum right low frequency when the low frequency partial region is arranged in a right direction with respect to the center of the sight.

In an embodiment, the minimum vertical low frequency may include the minimum upper low frequency and the minimum lower low frequency. The minimum low frequency may be the minimum upper low frequency when the low frequency partial region is arranged in an upper direction with respect to the center of the sight. The minimum low frequency may be the minimum lower low frequency when the low frequency partial region is arranged in a lower direction with respect to the center of the sight.

In an embodiment of an electronic device according to the present invention, the electronic device includes a display panel including a display region, a display panel driver configured to perform a multi-frequency driving for the display region, and a processor configured to control the display panel driver. The display region may include a first frequency partial region driven at a first frequency and a low frequency partial region driven at a low frequency lower than the first frequency. The display panel driver may be configured to determine a driving frequency of the low frequency partial region as a frequency greater than the minimum low frequency based on a position of the low frequency partial region.

According to the display device, the method, and the electronic device, a driving frequency of a low frequency partial region may be determined to be a frequency greater than the minimum low frequency based on a position of the low frequency partial region. Accordingly, a flicker may not be recognized by a user while a multi-frequency driving is performed.

BRIEF DESCRIPTION OF THE DRAWINGS

The above and other features of embodiments of the present invention will become more apparent by describing in detailed embodiments thereof with reference to the accompanying drawings, in which.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Hereinafter, the present invention will be described in more detail with reference to the accompanying drawings.

Figure 1:
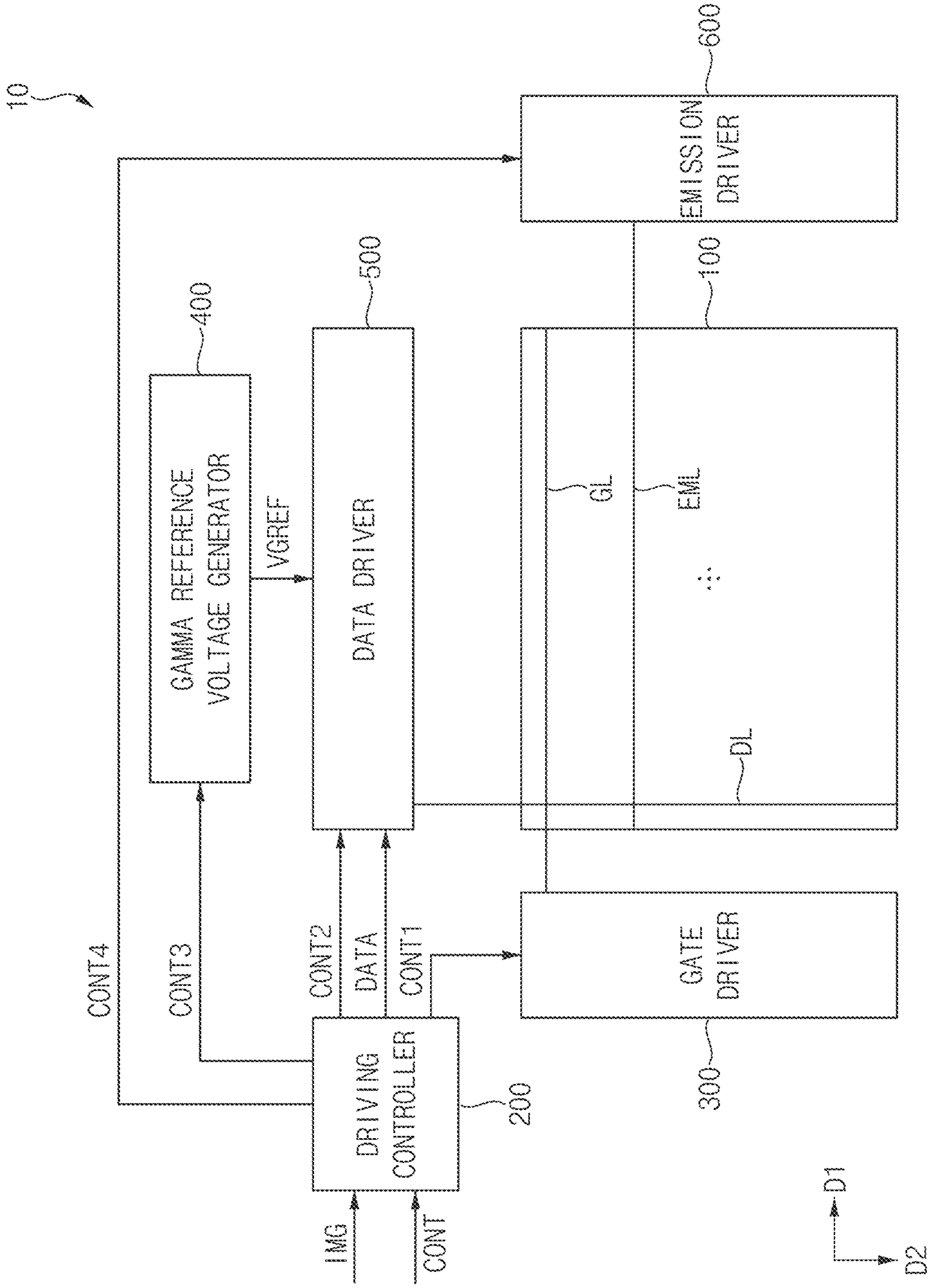
FIG. 1 is a block diagram showing a display device according to embodiments of the present invention.

FIG. 1 is a block diagram showing a display device 10 according to embodiments of the present invention.

Referring to FIG. 1, a display device 10 may include a display panel 100 and a display panel driver. The display panel driver may include a driving controller 200, a gate driver 300, a gamma reference voltage generator 400, and a data driver 500. In an embodiment, the display panel driver may further include an emission driver 600.

The display panel 100 may include a display region for displaying an image and a peripheral region disposed adjacent to the display region.

The display panel 100 may include gate lines GL, data lines DL, emission lines EML, and pixels electrically connected to the gate lines GL, the data lines DL, and the emission lines EML, respectively. The gate lines GL may extend in a first direction D1, the data lines DL may extend in a second direction D2 crossing the first direction D1, and the emission lines EML may extend in the first direction D1.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed within the driving controller 200 or may be disposed within the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In FIG. 1, for a convenience of an explanation, the gate driver 300 may be disposed on a first side of the display panel 100 and the emission driver 600 may be disposed on a second side of the display panel 100. Although shown, the present invention is not limited thereto. For example, both the gate driver 300 and the emission driver 600 may be disposed on the first side of the display panel 100. For example, both the gate driver 300 and the emission driver 600 may be disposed on both sides of the display panel 100. For example, the gate driver 300 and the emission driver 600 may be formed integrally.

The display device 10 may perform a multi-frequency driving. Specifically, the display panel driver (e.g., the driving controller 200) may perform the multi-frequency driving for the display region. The display region includes partial regions. The partial regions may include a normal partial region driven at a normal frequency and a low frequency partial region driven at a low frequency lower than the normal frequency. The low frequency partial region may be driven at the low frequency lower than the normal low frequency, such that a power consumption of the display device 10 may be reduced. That is, the normal frequency may be a basic frequency which is not changed, and the low frequency may be a frequency which is changed to be lower than the normal frequency in order to reduce the power consumption. The normal frequency may be referred to as a “first frequency”, and the normal partial region may be referred to as a “first frequency partial region”.

Figure 2:
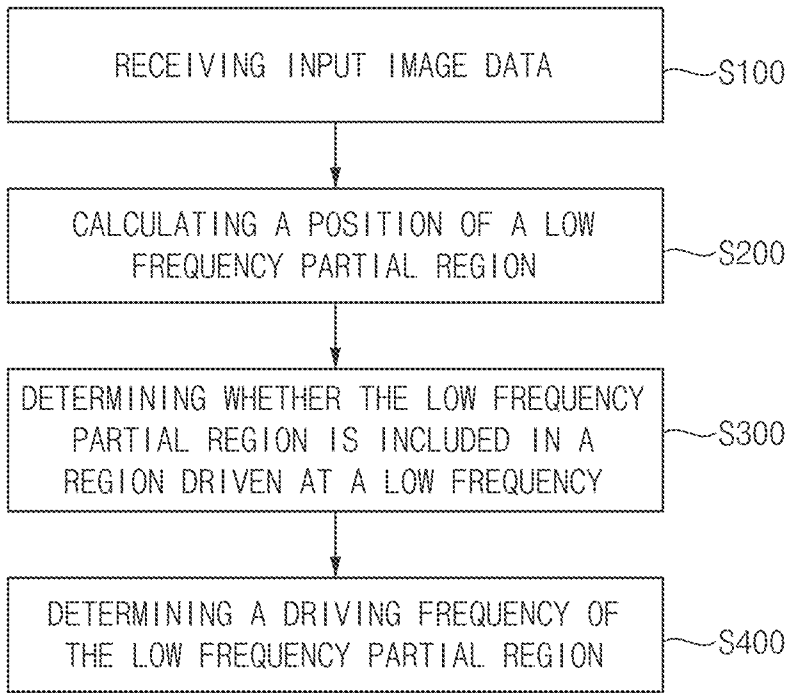
FIG. 2 is a flowchart showing a method of driving a display device according to embodiments of the present invention.

FIG. 2 is a flowchart showing a method of driving a display device 10 according to embodiments of the present invention.

Referring to FIG. 1 and FIG. 2, the display device 10 may be driven based on a method of driving the display device 10. The method of driving the display device 10 may include receiving input image data S100, calculating a position of a low frequency partial region, among a normal partial region driven at a normal frequency and a low frequency partial region driven at a low frequency which are included in a display region of a display panel 100, based on the input image data IMG S200, and determining a driving frequency of the low frequency partial region as a frequency greater than the minimum low frequency S400.

In some cases, the display panel 100 may have a limitation on a region driven at the low frequency. In this case, the method of driving the display device 10 may further include determining whether the low frequency partial region is included in a region driven at the low frequency S300.

Figure 3:
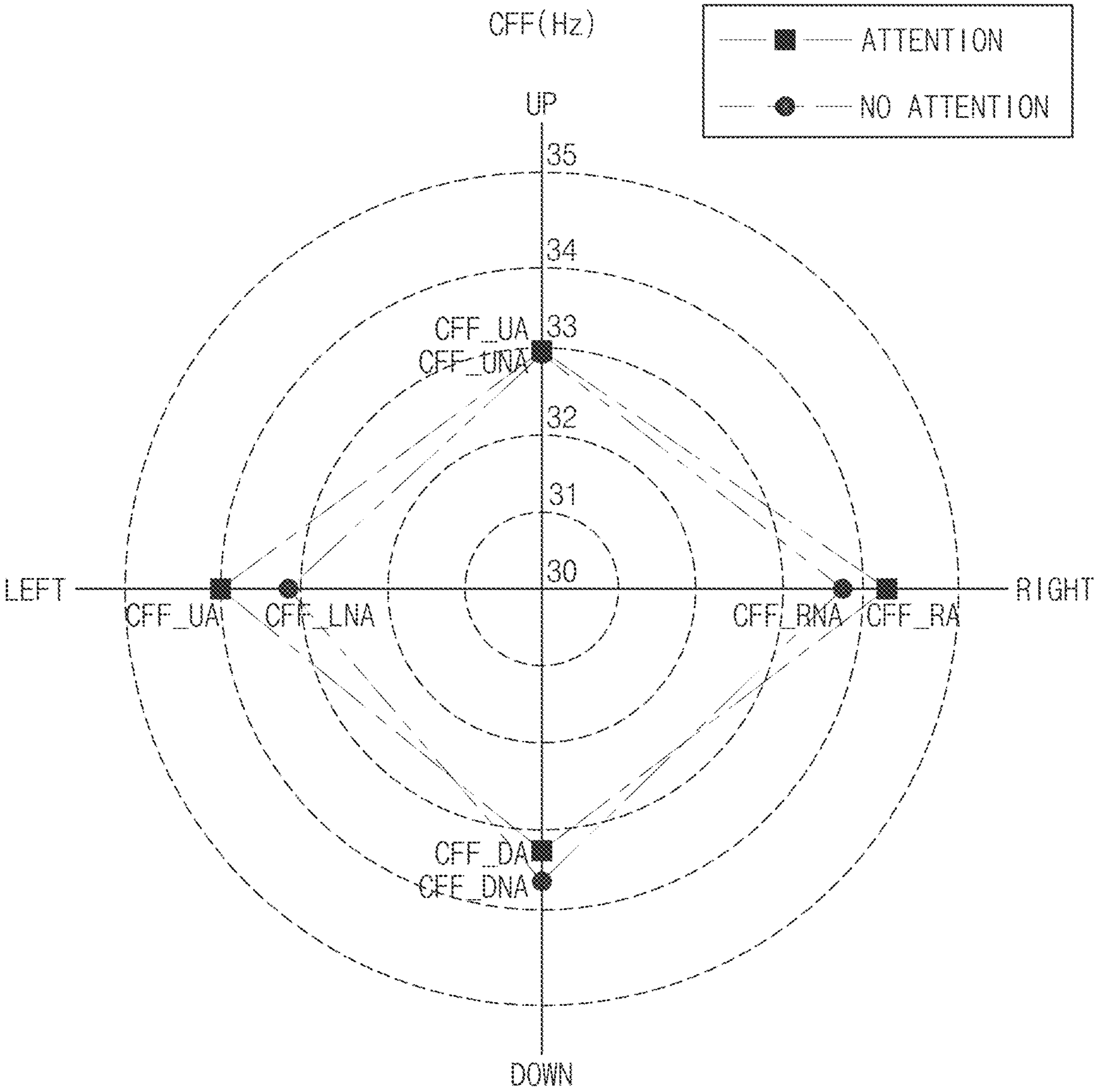
FIG. 3 is a graph explaining a critical flicker frequency at which a flicker is recognized.

FIG. 3 is a graph explaining a critical flicker frequency CFF at which a flicker is recognized.

Referring to FIGS. 1 to 3, when the display region is driven at the low frequency, a flicker may be recognized in the image displayed by the display region. The flicker refers to a phenomenon in which the display region flickers. Since the flicker causes a fatigue to a user who views the image displayed in the display region, it may be important to provide a user with the display device 10 which prevents the flicker. When a driving frequency of the display region is small, the flicker may be recognized, and a driving frequency of the display region at which the flicker begins to be recognized may be named a critical flicker frequency CFF. That is, when the driving frequency of the display region is equal to or lower than the critical flicker frequency CFF, the flicker may be recognized by the user.

However, the critical flicker frequency CFF may vary according to a position of the image displayed at the low frequency with respect to a center of a sight of the user. FIG. 3 is an experimental result showing the critical flicker frequency CFF. The experiment was performed with and without alerting the user that the video would be displayed at the low frequency.

A critical flicker frequency CFF in the case where the user was not alerted may include an upper direction critical flicker frequency CFF_UNA, a lower direction critical flicker frequency CFF_DNA, a left direction critical flicker frequency CFF_LNA, and a right direction critical flicker frequency CFF_RNA. Here, the upper direction, the lower direction, the left direction, and the right direction are determined with respect to the center of the sight.

As shown in FIG. 3, in the case where the user was not alerted, a horizontal critical flicker frequency CFF_LNA, CFF_RNA may be very similar to a vertical critical flicker frequency CFF_UNA, CFF_DNA.

On the other hand, a critical flicker frequency CFF in the case where the user was alerted may include an upper critical flicker frequency CFF_UA, a lower critical flicker frequency CFF_DA, a left critical flicker frequency CFF_LA, and a right critical flicker frequency CFF_RA. Here, the upper direction, the lower direction, the left direction, and the right direction are determined with respect to the center of the sight.

As shown in FIG. 3, in the case where the user was alerted, a horizontal critical flicker frequency CFF_LA, CFF_RA is different from a vertical critical flicker frequency CFF_UA, CFF_DA. For example, the horizontal critical flicker frequency CFF_LA, CFF_RA may be greater than the vertical critical flicker frequency CFF_UA, CFF_DA. That is, the user may recognize the flicker more sensitively in the horizontal direction than in the vertical direction.

Therefore, when the low frequency partial region is positioned in the horizontal direction with respect to the center of the sight, the minimum low frequency of the low frequency partial region may be named the minimum horizontal low frequency of the low frequency partial region, and the minimum horizontal low frequency of the low frequency partial region may be relatively large.

On the other hand, when the low frequency partial region is positioned in the vertical direction with respect to the center of the sight, the minimum low frequency of the low frequency partial region may be named the minimum vertical low frequency of the low frequency partial region, and the minimum vertical low frequency of the low frequency partial region may be relatively small.

In order to provide the user with the display device 10 which prevents the flicker while performing the multi-frequency driving, the display panel driver may determine a driving frequency of the low frequency partial region to be a frequency greater than the minimum low frequency based on a position of the low frequency partial region.

The minimum low frequency may be calculated based on a position of the low frequency partial region with respect to the center of the sight. When the low frequency partial region is arranged in the horizontal direction with respect to the center of the sight, the minimum low frequency may be the minimum horizontal low frequency. When the low frequency partial region is arranged in the vertical direction with respect to the center of the sight, the minimum low frequency may be the minimum vertical low frequency. The minimum horizontal low frequency may be different from the minimum vertical low frequency. For example, the minimum horizontal low frequency may be greater than the minimum vertical low frequency.

The minimum horizontal low frequency may include the minimum left low frequency and the minimum right low frequency. When the low frequency partial region is arranged in the left direction with respect to the center of the sight, the minimum low frequency may be the minimum left low frequency. When the low frequency partial region is arranged in the right direction with respect to the center of the sight, the minimum low frequency may be the minimum right low frequency.

The minimum vertical low frequency may include the minimum upper low frequency and the minimum lower low frequency. When the low frequency partial region is arranged in the upper direction with respect to the center of the sight, the minimum low frequency may be the minimum upper low frequency. When the low frequency partial region is arranged in the lower direction with respect to the center of the sight, the minimum low frequency may be the minimum lower low frequency.

Generally, when the user views a specific image, the user may expect that the specific image will be displayed with the low frequency. Therefore, the minimum upper low frequency may be the upper critical flicker frequency CFF_UA in the case where the user was alerted. The minimum lower low frequency may be the lower critical flicker frequency CFF_DA in the case where the user was alerted. The minimum left low frequency may be the left critical flicker frequency CFF_LA in the case where the user was alerted. The minimum right low frequency may be the right critical flicker frequency CFF_RA in the case where the user was alerted.

In an embodiment, the center of the sight may be determined based on a division line dividing the normal partial region and the low frequency partial region. In this case, the center of the sight may be considered to be fixed to the dividing line. In another embodiment, the center of the sight may be determined in a real time using a sensor.

The display device 10 performing the multi-frequency driving may be divided into a case where the display panel 100 limits a region driven at the low frequency and a case where the display panel 100 does not have the limitation. For example, when the display device 10 has the limitation, a first side of the display region may be driven at the low frequency, and a second side of the display region may not be driven at the low frequency. Therefore, when the display device 10 has the limitation, the display panel driver may determine whether the low frequency partial region is included in the region driven at the low frequency. When the low frequency partial region is not included in the region driven at the low frequency, the low frequency partial region may not be driven at the low frequency.

The minimum frequency at which the flicker is recognized may vary according to a luminance of the low frequency partial region. Therefore, the minimum frequency may be determined according to the luminance of the low frequency partial region.

Figure 4:
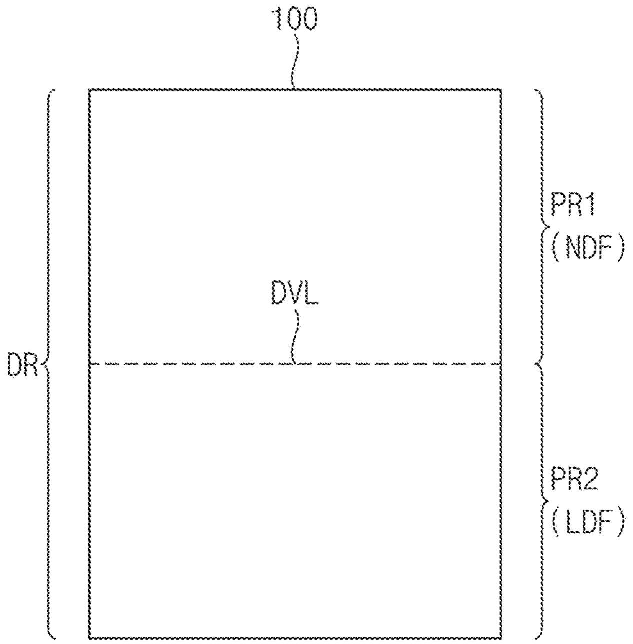
FIG. 4 is a drawing showing an example in which a first partial region and a second partial region are driven in a vertical mode.

FIG. 4 is a drawing showing an example in which a first partial region PR1 and a second partial region PR2 are driven in a vertical mode.

Referring to FIGS. 1 to 4, the display panel 100 may include the display region DR. The display region DR may include two partial regions, and the two partial regions may be the first partial region PR1 and the second partial region PR2. The first partial region PR1 and the second partial region PR2 may be divided based on a dividing line DVL.

The first partial region PR1 may be driven at the normal frequency NDF. Therefore, the first partial region PR1 may be the normal partial region. The second partial region PR2 may be driven at the low frequency LDF. Therefore, the second partial region PR2 may be the low frequency partial region.

The first partial region PR1 and the second partial region PR2 may be arranged adjacently in the vertical direction. Therefore, a driving frequency of the low frequency partial region PR2 may be determined to be a frequency greater than the minimum vertical low frequency. Since the low frequency partial region PR2 is arranged in the lower direction, the minimum vertical low frequency may be the minimum lower low frequency. Accordingly, the flicker may not be recognized by the user.

Figure 5:
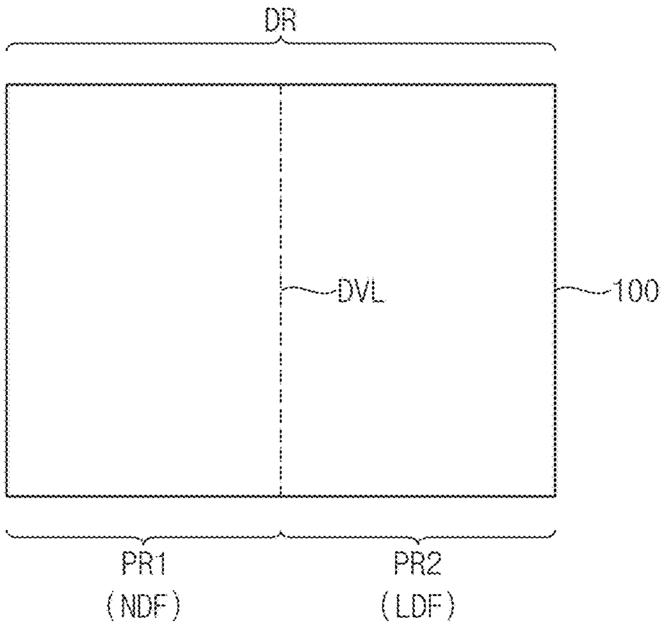
FIG. 5 is a diagram showing an example in which a first partial region and a second partial region are driven in a horizontal mode.

FIG. 5 is a diagram showing an example in which a first partial region PR1 and a second partial region PR2 are driven in a horizontal mode.

Referring to FIGS. 1 to 3 and FIG. 5, the display panel 100 may include the display region DR. The display region DR may include two partial regions, and the two partial regions may be a first partial region PR1 and a second partial region PR2. The first partial region PR1 and the second partial region PR2 may be divided based on a division line DVL.

The first partial region PR1 may be driven at the normal frequency NDF. Therefore, the first partial region PR1 may be the normal partial region. The second partial region PR2 may be driven at the low frequency LDF. Therefore, the second partial region PR2 may be the low frequency partial region.

The first partial region PR1 and the second partial region PR2 may be arranged adjacently in the horizontal direction. Therefore, a driving frequency of the low frequency partial region PR2 may be determined to be a frequency greater than the minimum horizontal low frequency. Since the low frequency partial region PR2 is arranged in the right direction, the minimum vertical low frequency may be the minimum right low frequency. Accordingly, the flicker may not be recognized by the user.

Figure 6:
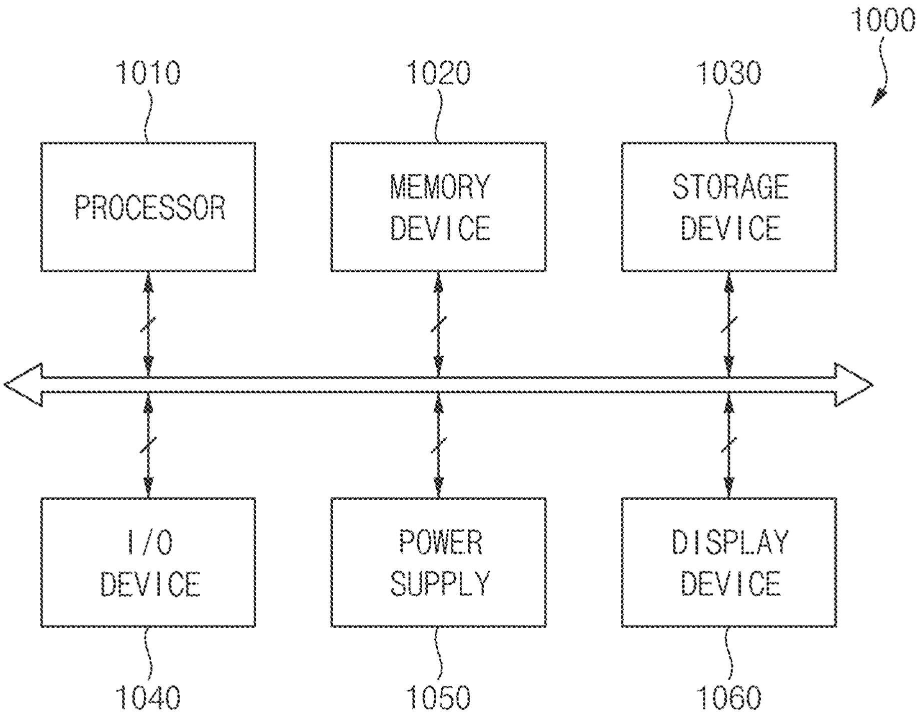
FIG. 6 is a block diagram showing an electronic device.
Figure 7:
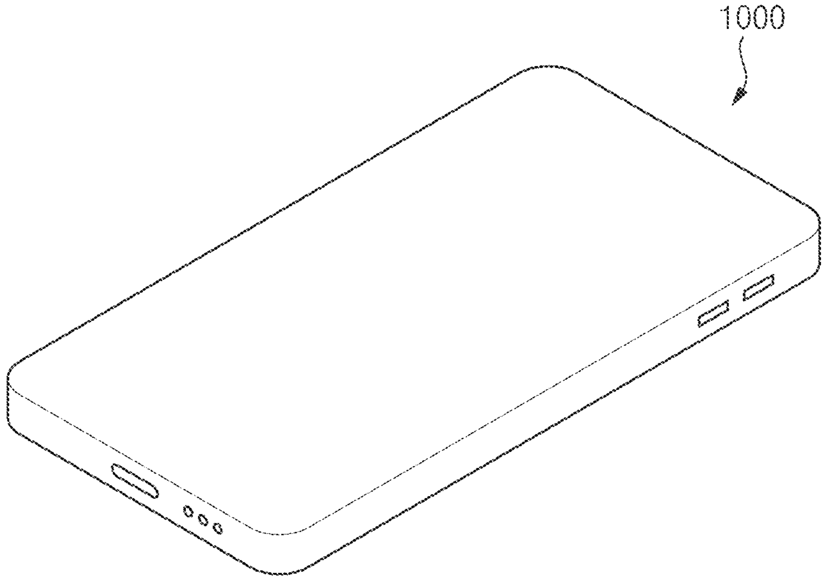
FIG. 7 is a diagram showing an embodiment in which an electronic device of FIG. 6 is implemented as a smart phone.

FIG. 6 is a block diagram showing an electronic device. FIG. 7 is a diagram showing an embodiment in which an electronic device of FIG. 6 is implemented as a smart phone.

Referring to FIGS. 6 and 7, an electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus USB device, other electronic device, and the like.

In an embodiment, as shown in FIG. 7, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a microprocessor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. For example, the inventions may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display device, comprising:

a display panel including a display region; and a display panel driver, which performs a multi-frequency driving for the display region, wherein the display region includes a first frequency partial region driven at a first frequency and a low frequency partial region driven at a low frequency lower than the first frequency, wherein the display panel driver is configured to determine a driving frequency of the low frequency partial region as a frequency greater than a minimum low frequency based on a position of the low frequency partial region, and wherein the minimum low frequency is calculated based on a position of the low frequency partial region with respect to a center of a sight.

2. The display device of claim 1, wherein the minimum low frequency is a minimum horizontal low frequency when the low frequency partial region is arranged in a horizontal direction with respect to the center of the sight, wherein the minimum low frequency is a minimum vertical low frequency when the low frequency partial region is arranged in a vertical direction with respect to the center of the sight, and wherein the minimum horizontal low frequency is different from the minimum vertical low frequency.

3. The display device of claim 2, wherein the minimum horizontal low frequency is greater than the minimum vertical low frequency.

4. The display device of claim 2, wherein the minimum horizontal low frequency includes a minimum left low frequency and a minimum right low frequency, wherein the minimum low frequency is the minimum left low frequency when the low frequency partial region is arranged in a left direction with respect to the center of the sight, and wherein the minimum low frequency is the minimum right low frequency when the low frequency partial region is arranged in a right direction with respect to the center of the sight.

5. The display device of claim 2, wherein the minimum vertical low frequency includes a minimum upper low frequency and a minimum lower low frequency, wherein the minimum low frequency is the minimum upper low frequency when the low frequency partial region is arranged in an upper direction with respect to the center of the sight, and wherein the minimum low frequency is the minimum lower low frequency when the low frequency partial region is arranged in a lower direction with respect to the center of the sight.

6. The display device of claim 1, wherein the minimum low frequency is a critical flicker frequency at which a flicker is recognized.

7. The display device of claim 1, wherein the center of the sight is determined based on a border dividing the first frequency partial region and the low frequency partial region.

8. The display device of claim 1, wherein the center of the sight is determined in a real time using a sensor.

9. The display device of claim 1, wherein the display panel driver is configured to determine whether the low frequency partial region is included in a region driven at the low frequency when the display panel limits the region driven at the low frequency.

10. The display device of claim 1, wherein the minimum low frequency is a minimum horizontal low frequency when the display panel is driven in a horizontal mode in which the first frequency partial region and the low frequency partial region are arranged adjacently in a horizontal direction, wherein the minimum low frequency is a minimum vertical low frequency when the display panel is driven in a vertical mode in which the first frequency partial region and the low frequency partial region are arranged adjacently in a vertical direction, and wherein the minimum horizontal low frequency is different from the minimum vertical low frequency.

11. The display device of claim 10, wherein the minimum horizontal low frequency is greater than the minimum vertical low frequency.

12. The display device of claim 1, wherein the minimum low frequency varies according to a luminance of the low frequency partial region.

13. A method of driving a display device, the method comprising:

receiving input image data;

calculating a position of a low frequency partial region, among a first frequency partial region driven at a first frequency and a low frequency partial region driven at a low frequency which are included in a display region of a display panel, based on the input image data, wherein the low frequency is lower than the first frequency; and determining a driving frequency of the low frequency partial region as a frequency greater than a minimum low frequency, wherein the minimum low frequency is calculated based on a position of the low frequency partial region with respect to a center of a sight.

14. The method of claim 13, wherein the minimum low frequency is a minimum horizontal low frequency when the low frequency partial region is arranged in a horizontal direction with respect to the center of the sight, wherein the minimum low frequency is a minimum vertical low frequency when the low frequency partial region is arranged in a vertical direction with respect to the center of the sight, and wherein the minimum horizontal low frequency is different from the minimum vertical low frequency.

15. The method of claim 14, wherein the minimum horizontal low frequency is greater than the minimum vertical low frequency.

16. The method of claim 14, wherein the minimum horizontal low frequency includes a minimum left low frequency and a minimum right low frequency, wherein the minimum low frequency is the minimum left low frequency when the low frequency partial region is arranged in a left direction with respect to the center of the sight, and wherein the minimum low frequency is the minimum right low frequency when the low frequency partial region is arranged in a right direction with respect to the center of the sight.

17. The method of claim 14, wherein the minimum vertical low frequency includes a minimum upper low frequency and a minimum lower low frequency, wherein the minimum low frequency is the minimum upper low frequency when the low frequency partial region is arranged in an upper direction with respect to the center of the sight, and wherein the minimum low frequency is the minimum lower low frequency when the low frequency partial region is arranged in a lower direction with respect to the center of the sight.

18. An electronic device, comprising:

a display panel including a display region;

a display panel driver, which performs a multi-frequency driving for the display region; and a processor, which controls the display panel driver, wherein the display region includes a first frequency partial region driven at a first frequency and a low frequency partial region driven at a low frequency lower than the first frequency, wherein the display panel driver is configured to determine a driving frequency of the low frequency partial region as a frequency greater than a minimum low frequency based on a position of the low frequency partial region, and wherein the minimum low frequency is calculated based on a position of the low frequency partial region with respect to a center of a sight.

* * * * *